US006983044B2

(12) United States Patent
Clifton et al.

(10) Patent No.: US 6,983,044 B2
(45) Date of Patent: Jan. 3, 2006

(54) RELATIONSHIP BUILDING METHOD FOR AUTOMATED SERVICES

(75) Inventors: Keith A. Clifton, Lubbock County, TX (US); Joel L. Hohenberger, Lubbock County, TX (US)

(73) Assignee: Tenant Tracker, Inc., McKinney, TX (US)

( * ) Notice: Subject to any disclaimer, the term of this patent is extended or adjusted under 35 U.S.C. 154(b) by 358 days.

(21) Appl. No.: 09/894,599

(22) Filed: Jun. 27, 2001

(65) Prior Publication Data

US 2003/0004820 A1    Jan. 2, 2003

(51) Int. Cl.
H04M 3/00        (2006.01)
H04M 5/00        (2006.01)
H04M 11/00       (2006.01)

(52) U.S. Cl. .............................. 379/265.09; 379/88.18; 705/26

(58) Field of Classification Search ........... 379/265.09, 379/265.02, 266.01, 88.18, 88.22, 88.25; 705/26, 27, 43
See application file for complete search history.

(56) References Cited

U.S. PATENT DOCUMENTS

| 4,882,475 A | * | 11/1989 | Miller et al. ................. 235/383 |
| 4,971,406 A | * | 11/1990 | Hanson ........................ 345/10 |
| 5,845,263 A | * | 12/1998 | Camaisa et al. .............. 705/27 |
| 5,901,214 A | * | 5/1999 | Shaffer et al. ......... 379/211.02 |
| 5,915,246 A | * | 6/1999 | Patterson et al. ............. 705/43 |
| 5,983,200 A | * | 11/1999 | Slotznick ..................... 705/26 |
| 6,456,699 B1 | * | 9/2002 | Burg et al. .............. 379/88.17 |
| 2001/0018671 A1 | * | 8/2001 | Ogasawara .................. 705/26 |

* cited by examiner

Primary Examiner—Benny Q. Tieu
(74) Attorney, Agent, or Firm—W. Thomas Timmons

(57) ABSTRACT

A relationship building method for automated services is disclosed, which includes the steps of receiving a contact from a client such as by telephone or over the Internet or other computer network, looking for the client in a client data base, and if the client is in the client data base, then welcoming the client. If the client is calling by telephone and does not like auto attendant, then the client is transferred to a customer service representative. The client is presented with an option of one or more services or goods that are usual for the client as determined by the client data base. If the client selects one of the usual services or goods, then the client request is processed, but if the client does not select one of the usual services or goods, then the client is presented with a list of services or goods from which to select, the new request is entered into the client data base, and the client request is processed. If the client is new, then the client is welcomed and asked for billing and delivery information which is then entered into the client data base. The client is then presented with a list of services or goods from which to select and the new request is also entered into the client data base. The client is presented with a list of delivery methods from which to select. If the services are rendered or the goods are distributed from a plurality of locations, further processing the client request includes creating a plurality of web pages on a computer network, corresponding to the plurality of locations, and posting the client information and the client request information on a web page of the plurality of web pages corresponding to a location which is close to the client. Using telephone caller identification, the client or clients who normally call from the identified telephone number can be identified. Interactive voice response and speed dial numbers corresponding to predetermined services or goods are also included.

22 Claims, 10 Drawing Sheets

RELATIONSHIP BUILDING METHOD FOR AUTOMATED SERVICES

BACKGROUND OF THE INVENTION

1. Field of the Invention

The present invention relates generally to taking orders for goods and services over telephone or a computer network, and in particular, for taking such orders automatically while building a relationship data base.

2. Description of Related Art

U.S. Pat. No. 5,915,246 (Patterson et al.) shows an ATM type service "which operates in a predictive manner, in that when a user enters their card, the machine identifies the user, predicts the transaction most likely to be requested by that user, and presents one or more relevant messages, such as 'Do you require £20?' or 'Do you require a mini statement?', in accordance with that user's habitual transaction request or requests." It is a fully automated system for a customer who is present at the machine, with only customer intervention, and it is designed to work only with existing customers.

Both U.S. Pat. No. 5,737,726 (Cameron et al.) and U.S. Pat. No. 5,832,451 (Flake et al.) show systems where the customer communicates directly with an agent. The computer system retains customer preferences and other information, but it works through a human agent.

The Internet has numerous web sites with automatic ordering, but such sites for ordering books or music are not adapted for repeat orders of the same or similar products and do not allow for product specification, such as is common in ordering pizza, where a customer will specify size, toppings and crust type. In addition, the systems to do appear to be equally adaptable for network or telephone access.

SUMMARY OF THE INVENTION

In a preferred arrangement, the present invention, a relationship building method for automated services includes the steps of receiving a contact from a client such as by telephone or over the Internet or other computer network, looking for the client in a client data base, and if the client is in the client data base, then welcoming the client by name. If the client is calling by telephone and does not like auto attendant, then the client is transferred to a customer service representative. If the goods are delivered or the services are rendered from many different locations, then the client is transferred to a customer representative located near the client. Otherwise, the client is presented with an option of one or more services or goods that are usual for the client as determined by the client data base. If the client selects one of the usual services or goods, then the client request is processed, but if the client does not select one of the usual services or goods, then the client is presented with a list of services or goods from which to select, the new request is entered into the client data base, and the client request is processed.

If, however, the client is not in the client data base, then the client is welcomed and asked for billing and delivery information. The client billing and delivery information is then entered into the client data base. The client is then presented with a list of services or goods from which to select and the new request is also entered into the client data base, and the client request is processed.

In another preferred arrangement of a relationship building method for automated services according to the present invention, processing the client request further includes the steps of, if the client is in the client data base, presenting the client with an option of one or more methods for delivery of services or goods that are usual for the client as determined by the client data base, and if the client selects one of the usual methods of delivery, then further processing the client request. If the client does not select one of the usual methods of delivery, then the client is presented with a list of delivery methods from which to select, entering the new method into the client data base and the client request is further processed. If, on the other hand, the client is not in the client data base, then the client is presented with a list of delivery methods from which to select and the new method selected by the client is entered into the client data base, and the client request is further processed.

In yet another arrangement of a relationship building method for automated services according to the present invention in which the services are rendered or the goods are distributed from a plurality of locations, further processing the client request includes creating a plurality of web pages on a computer network, corresponding to the plurality of locations, and posting the client information and the client request information on a web page of the plurality of web pages corresponding to a location which is close to the client. In a preferred form, presenting the client with a list of services or goods from which to select includes the step of presenting a series of options regarding services or goods. For contact by telephone call from the client, the relationship building method further includes using telephone caller identification, and looking for the client in a client data base includes determining what client or clients normally call from the identified telephone number. One preferred form of the relationship building method further includes communicating with the client is by means of interactive voice response.

If, after initial contact be telephone, the client is in the client data base and dials a predetermined speed dial number corresponding to predetermined services or goods, then an order is processed that corresponds to the speed dial number.

These and other objects, advantages and features of this invention will be apparent from the following description taken with reference to the accompanying drawing, wherein is shown a preferred embodiment of the invention.

DESCRIPTION OF THE PREFERRED EMBODIMENTS

Figure 1:
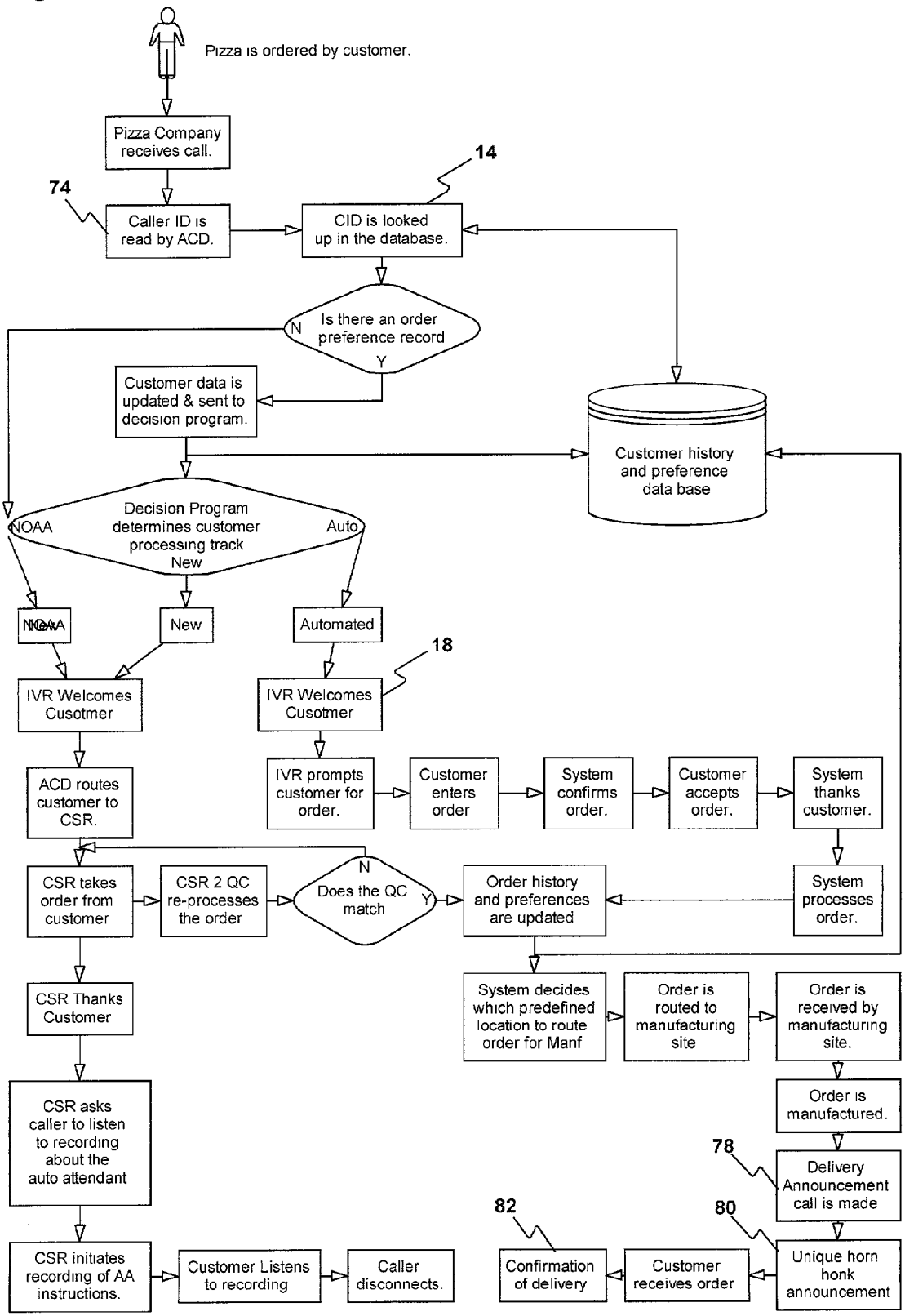
FIG. 1 is a flow diagram of a relationship building method for automated services, including processing orders and delivery of orders, according to the present invention.
Figure 2:
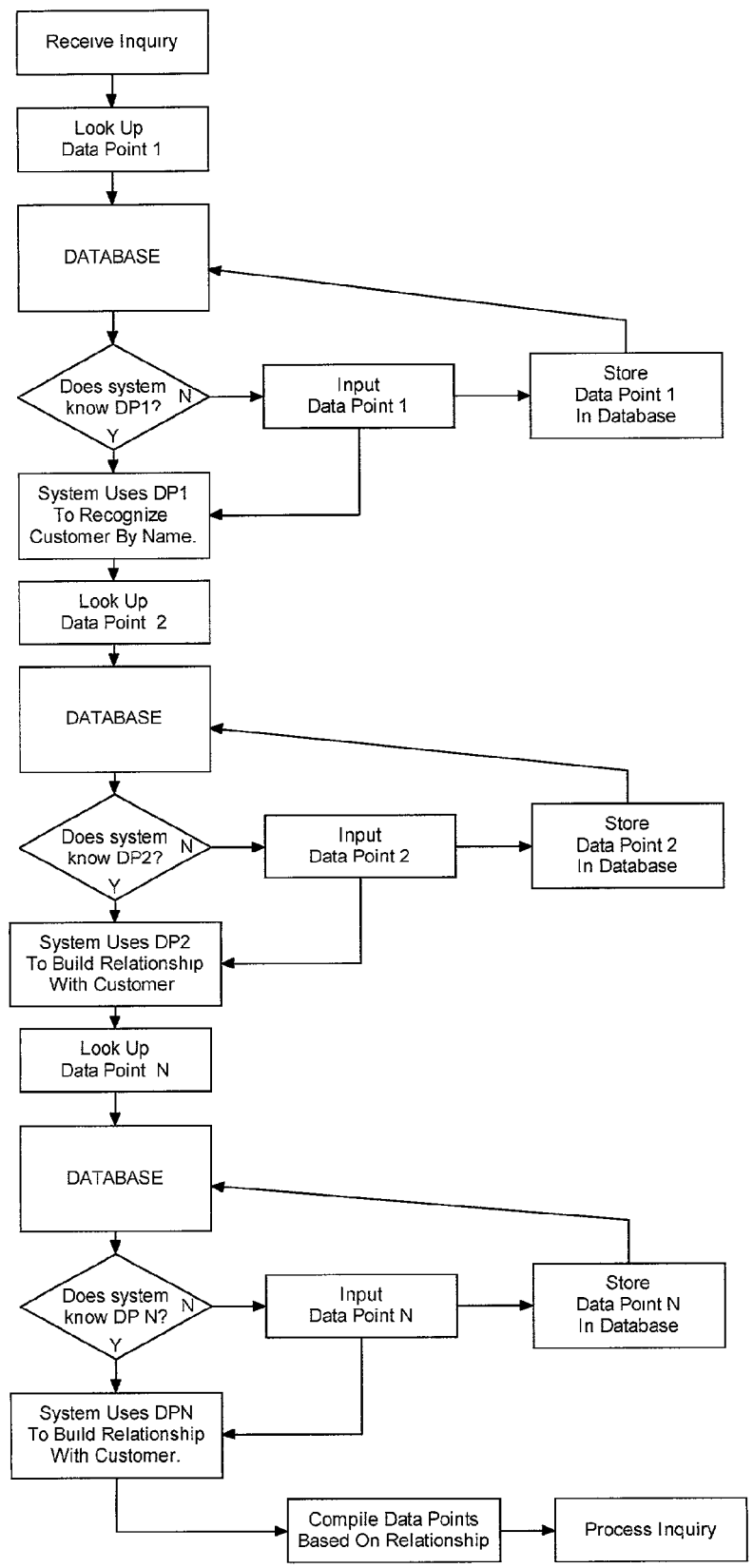
FIG. 2 is a flow diagram of a method for creating a relationship building data base according to the present invention.
Figure 3:
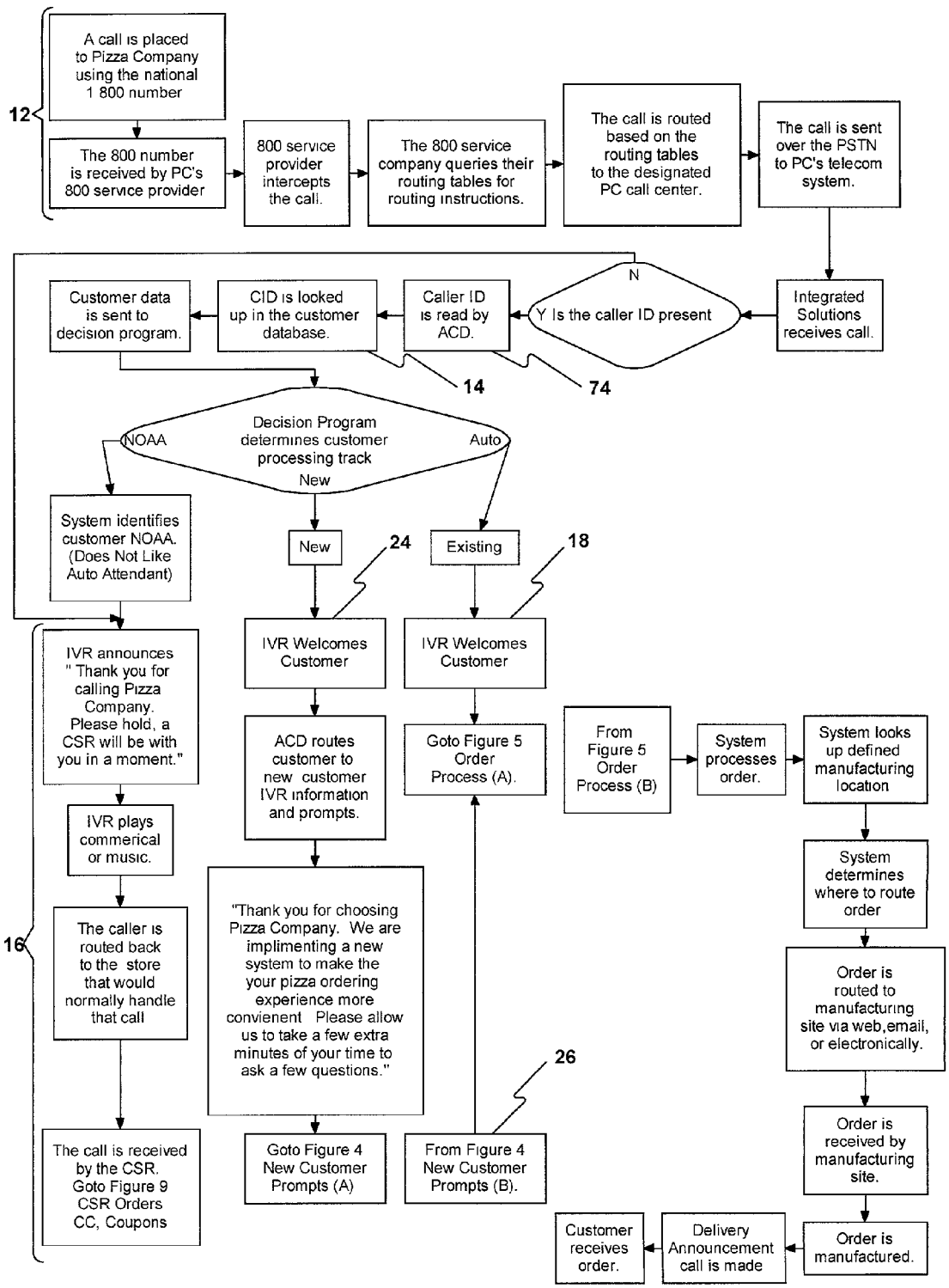
FIG. 3 is a flow diagram of the start of a relationship building method for automated services according to the present invention.
Figure 5:
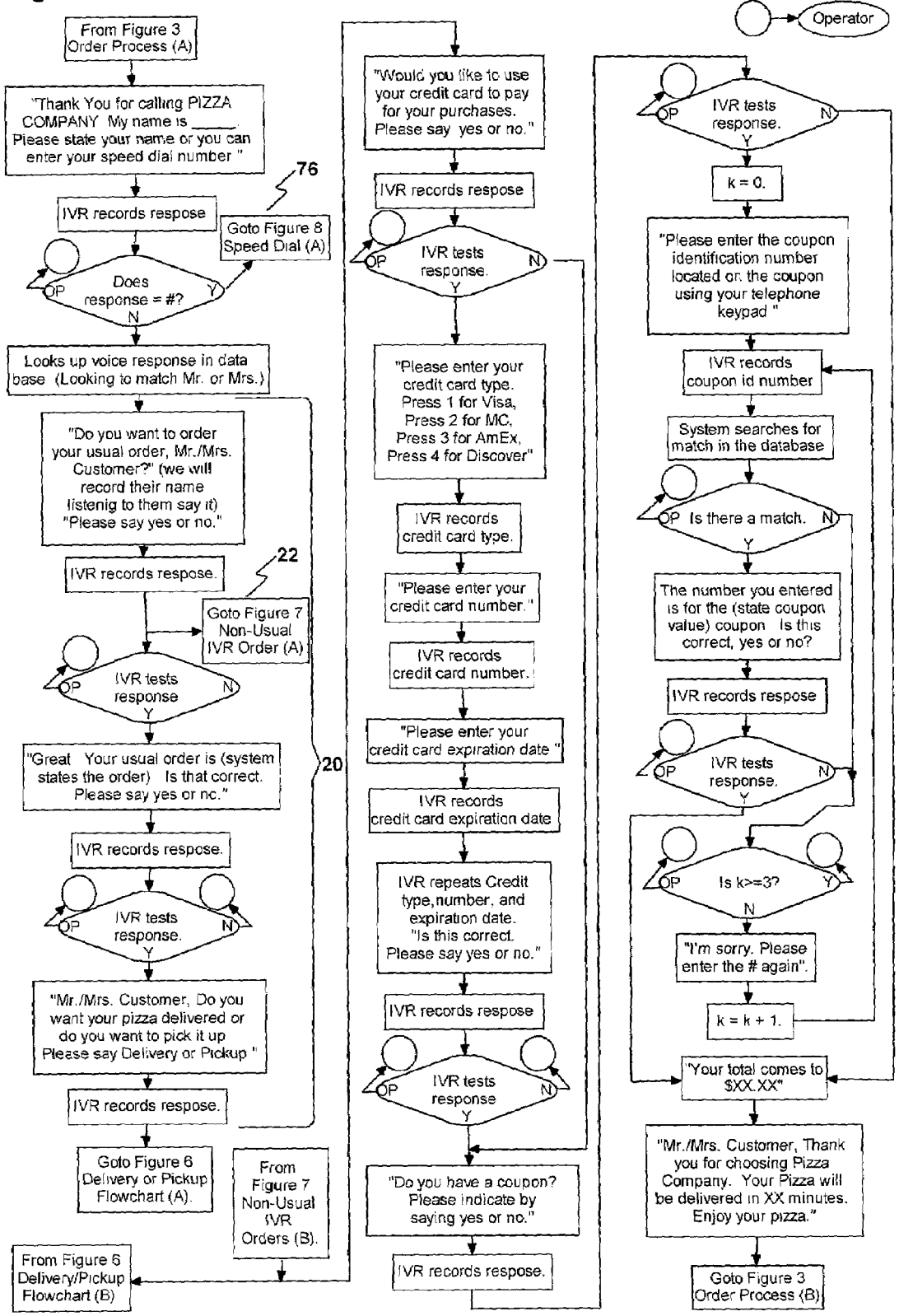
FIG. 5 is a flow diagram of an ordering process according to the present invention.

Referring now to the drawing, and in particular to FIG. 1, FIG. 2 and FIG. 3, in a preferred arrangement of the present invention, a relationship building method for automated services includes the steps of receiving a contact 12 from a client such as by telephone or over the Internet or other computer network and looking 14 for the client in a client data base. Client is used here to include what is typically termed a "customer," and includes the potential purchaser of both goods and services. If the client is calling by telephone and does not like auto attendant, then the client is transferred 16 to a customer service representative. If the goods are delivered or the services are rendered from many different locations, then the client is transferred to a customer representative located near the client. If the client is in the client data base, then the client is welcomed 18, in a preferred form, by name. Referring also to FIG. 5, the client is presented 20 with an option of one or more services or goods that are usual for the client as determined by the client data base. If the client selects one of the usual services or goods, then the client request is processed, but if the client does not select one of the usual services or goods, then the client is presented 22 with a list of services or goods from which to select, the new request is entered into the client data base, as described further on, and the client request is processed.

Figure 4:
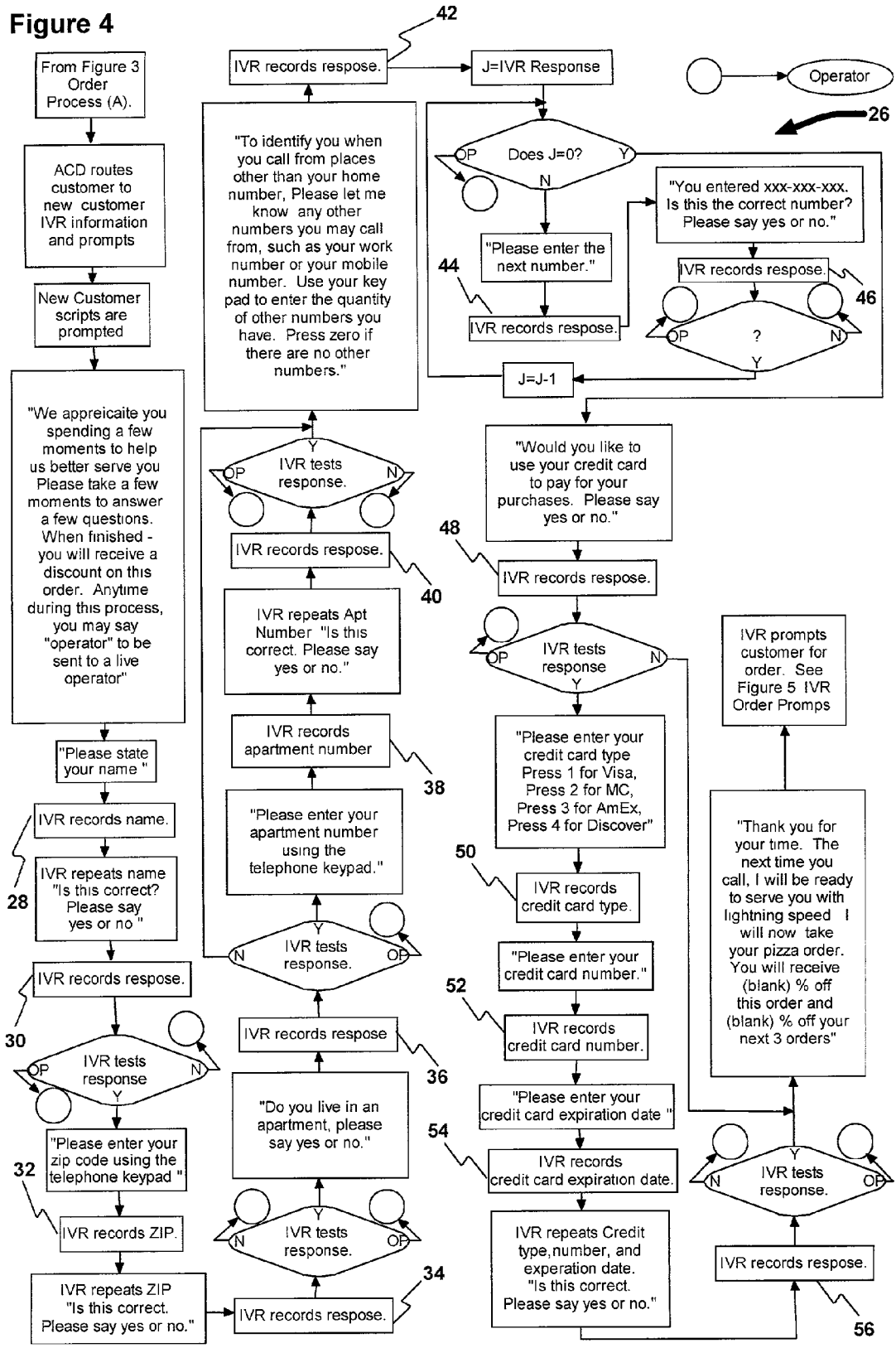
FIG. 4 is a flow diagram of gathering information about a new customer in accordance with the present invention.

If, however, the client is not in the client data base, then the client is welcomed 24 and asked 26 for billing and delivery information. Referring to FIG. 4, the client billing and delivery information is then entered into the client data base, in the embodiment illustrated: name 28, confirmation of name 30, zip code 32, confirmation of zip code 34, live in an apartment 36, apartment number 38, confirmation of apartment number 40, number of other telephone numbers 42, next number 44, confirmation of next number 46, pay by credit card 48, type of credit card 50, credit card number 52, expiration date 54 and confirmation of credit card number and expiration date 56. The client is then presented 22 with a list of services or goods from which to select and the new request is also entered into the client data base, in the embodiment illustrated, number of pizzas 58, type of pizza 60, type of crust 62, what size pizza 64, confirmation of size, type (topping) and crust 66, and make usual order 68, and the client request is processed.

Figure 6:
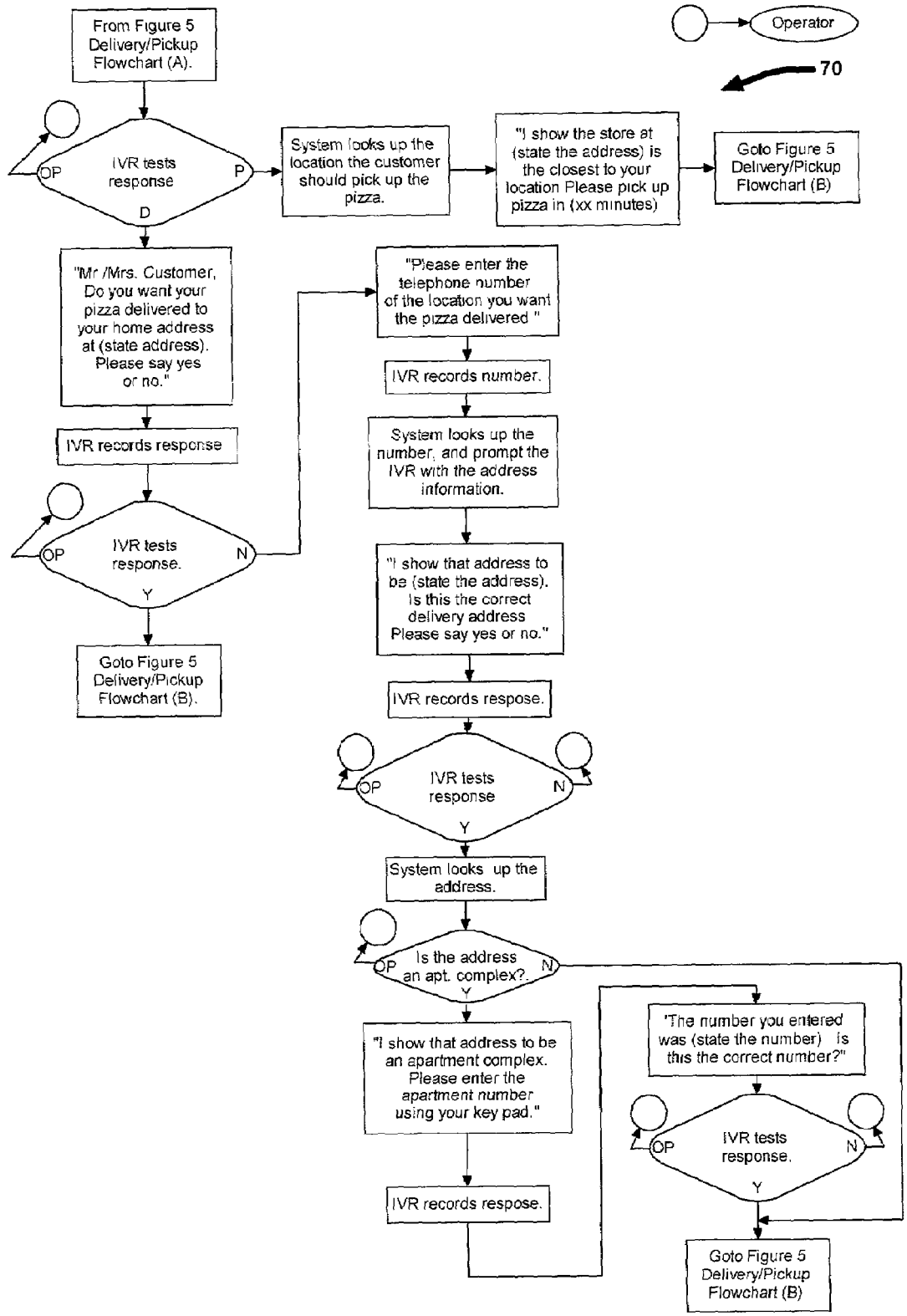
FIG. 6 is a flow diagram of a method for an interactive voice response for pickup and delivery instructions, according to the present invention.
Figure 7:
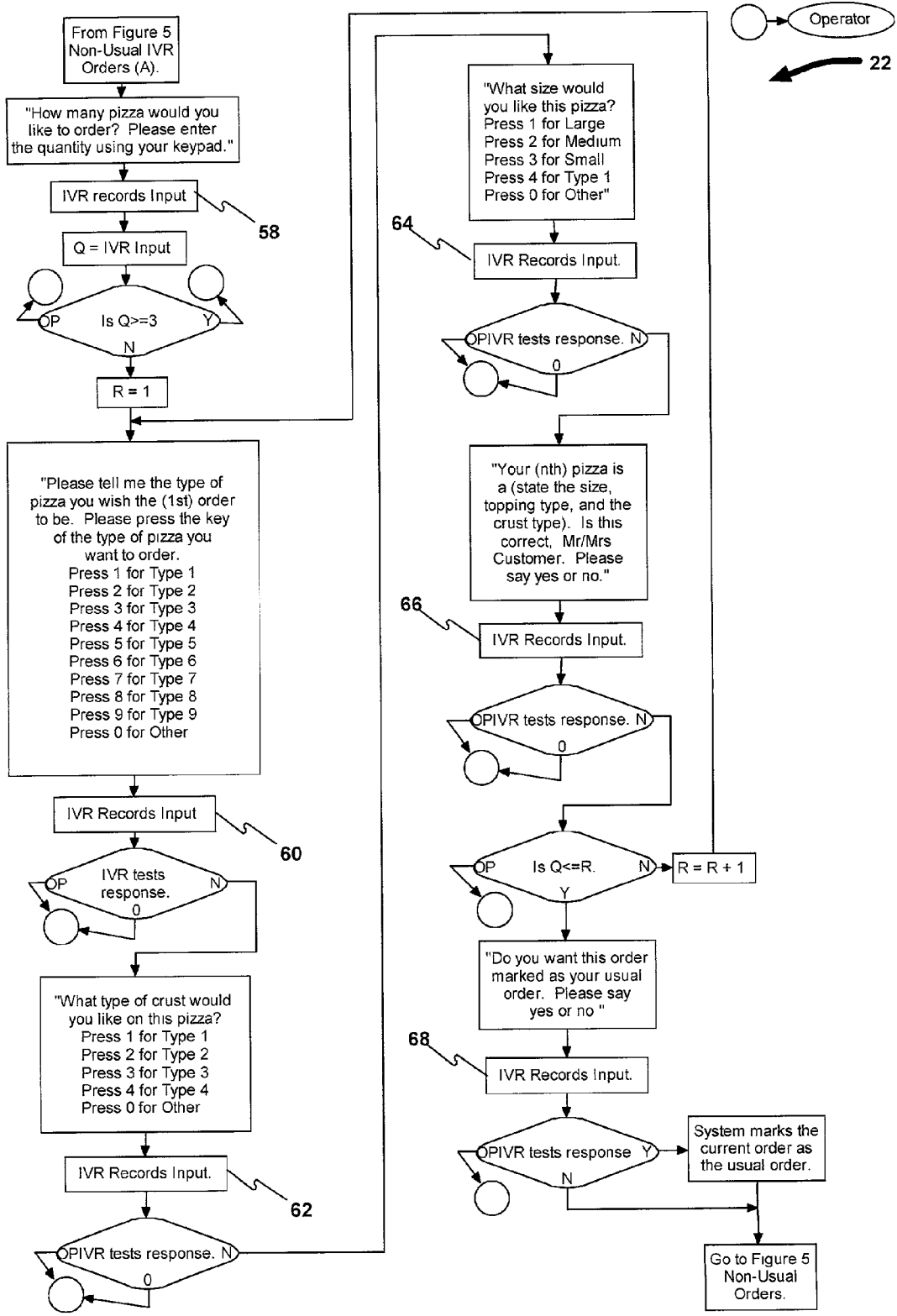
FIG. 7 is a flow diagram of a method for handling non-usual orders, according to the present invention.

Referring also to FIG. 6, in another preferred arrangement of a relationship building method for automated services according to the present invention, processing the client request further includes the steps of, if the client is in the client data base, presenting the client with an option of one or more methods for delivery of services or goods, which might be those that are usual for the client as determined by the client data base, and if the client selects one of the usual methods of delivery, then further processing the client request. If the client does not select one of the usual methods of delivery, then the client is presented 70 with a list of delivery methods from which to select, entering the new method into the client data base and the client request is further processed. If, on the other hand, the client is not in the client data base, then the client is presented 70 with a list of delivery methods from which to select and the new method selected by the client is entered into the client data base, and the client request is further processed.

In yet another arrangement of a relationship building method for automated services according to the present invention in which the services are rendered or the goods are distributed from a plurality of locations, further processing the client request includes creating 72 a plurality of web pages on a computer network, corresponding to the plurality of locations, and posting the client information and the client request information on a web page of the plurality of web pages corresponding to a location which is close to the client. In a preferred form, presenting the client with a list of services or goods from which to select includes the step of presenting a series of options regarding services or goods. For contact by telephone call from the client, the relationship building method further includes using telephone caller identification, and looking for the client in a client data base includes determining 14 and 74 what client or clients normally call from the identified telephone number. One preferred form of the relationship building method further includes communicating with the client is by means of interactive voice response (IVR).

Figure 8:
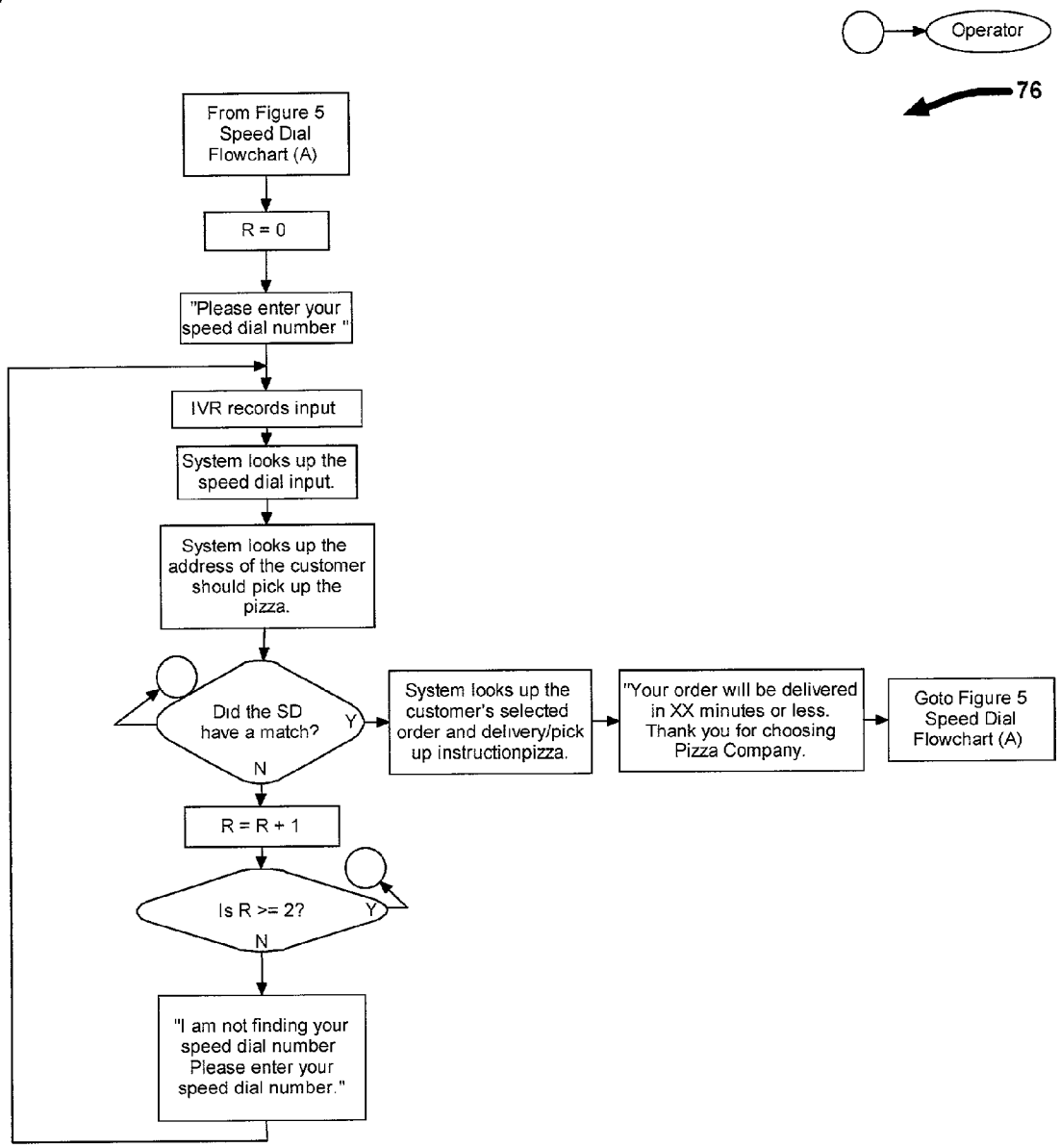
FIG. 8 is a flow diagram of a method for processing speed dial orders according to the present invention.
Figure 9:
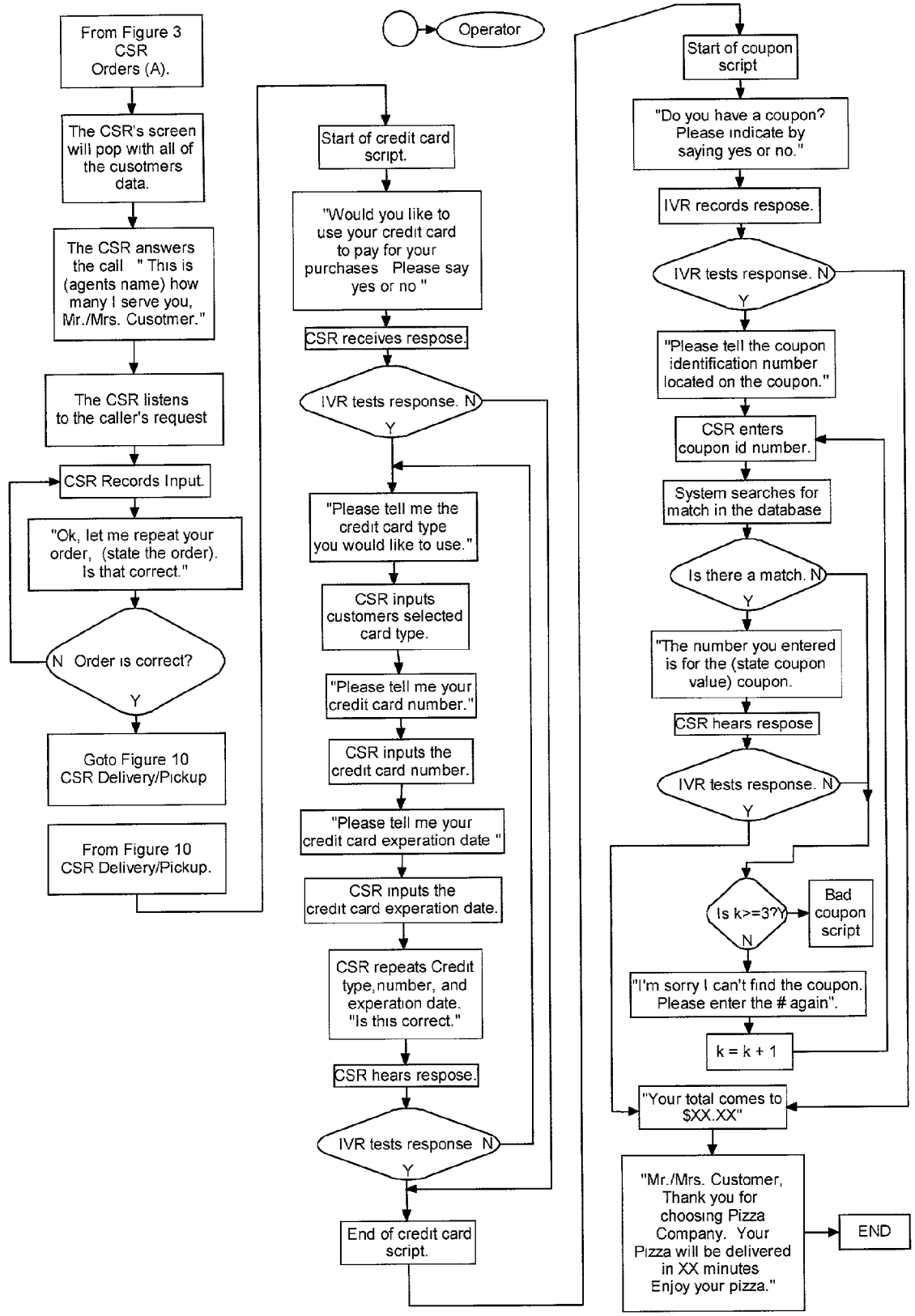
FIG. 9 is a flow diagram of a method for processing orders through a customer service representative, the use of credit card payment and coupons, according to the present invention.
Figure 10:
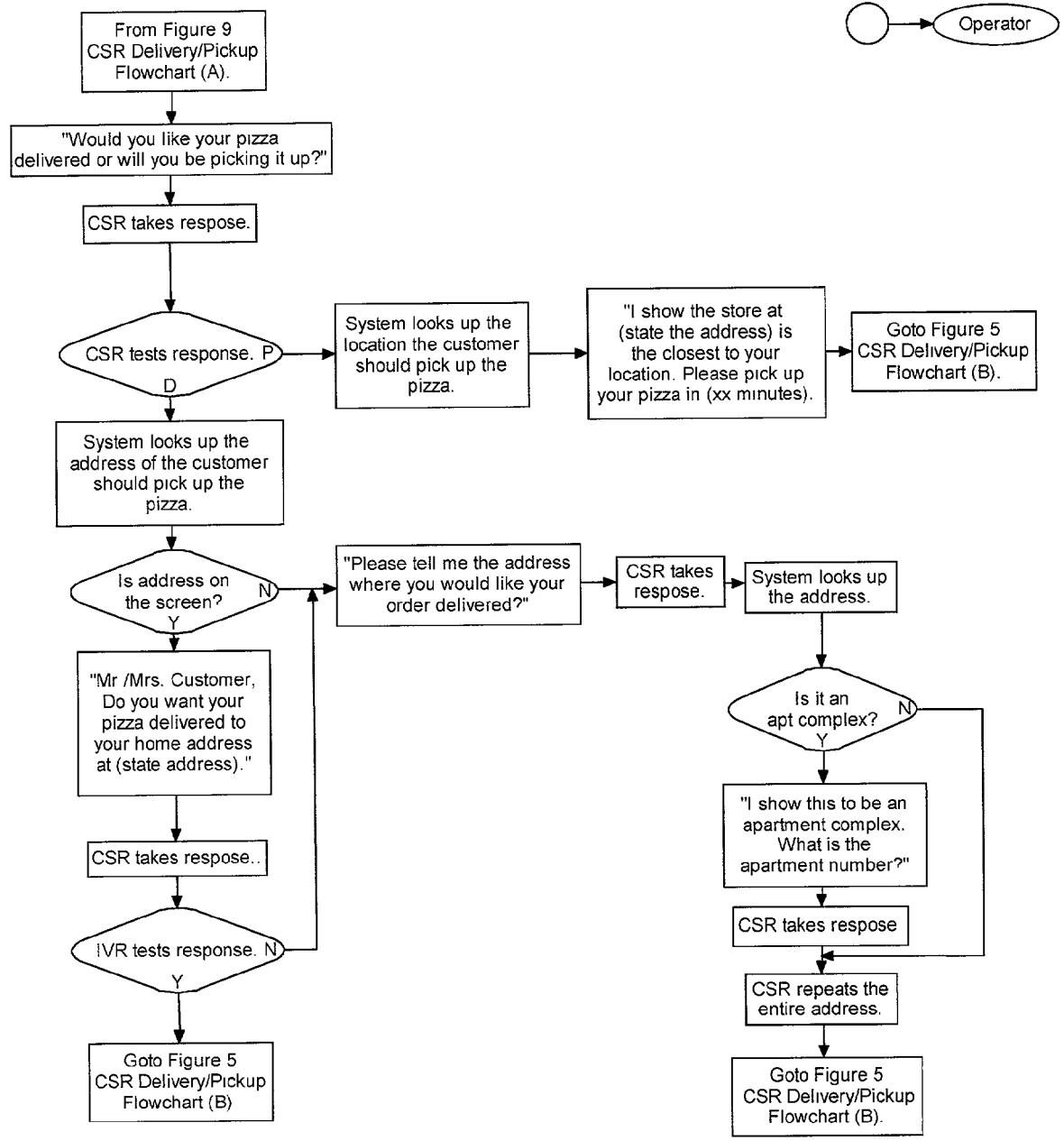
FIG. 10 is a flow diagram of a method for processing customer service representative pickup and delivery instructions.

Referring now to FIG. 8, if, after initial contact be telephone, the client is in the client data base and dials 76 a predetermined speed dial number corresponding to predetermined services or goods, then an order is processed that corresponds to the speed dial number.

The essence of the systemic relationship building model/engine is that on each contact the system expands its knowledge about the habits and likes of the company's clients, and re-enforces the corporate knowledge by repeating it or offering it to the client on subsequent contacts and thereby reaffirm the relationship.

For example, a spouse knows their mate's menu likes and dislikes as a matter of repetition and memory. Likewise, an existing customer calls in and a customer service representative or an operator asks them to pronounce their full name. The full name is recorded in their pronunciation and on all future calls, the name is whisper announced to the operator so that the operator knows the exact pronunciation from the clients own mouth. If a customer makes a variation on their standard order—that variation is held in the data base and presented to the operator along with the primary preference on future client call ins.

Method of Telephone Processing on a Regional or National Number:

Currently the customer has the burden of finding the correct store and number. Under the systemic relationship system the customer's caller ID (ANI) would be captured and added to their preference profile. After the ANI preference profile is built, then by using a nation/regional wide number (800 or otherwise) the call will be automatically routed to the correct service location, often times before the customer hears the first ring on the telephone.

Current processing systems are incapable of advertising a national 800 number and processing the orders to the appropriate store. As a result, sale poaching is a problem in the current ordering systems, and would be eliminated with the relationship building system of this invention.

Method of Order Taking:

A key aspect of a great relationship is the ability to get it right the first time, which is actually a derivative of knowing their preferences and double checking. The systemic relationship model will achieve this by recording the order and using a dual entry quality control—when a call is received that flows into a live order processing operator the call would be recorded and reentered by a second operator. If a discrepancy is noted it would trigger a call back to ask for clarification.

The delivery address is confirmed via ANI look up from the client history data base, and subsequent customer input and if needed modified by a customer service representative interview with the client.

Also, based upon previous orders the system will learn the customer's preferred payment method (Cash or credit card).

Further, based upon the history of regular orders the preferred customer ANI would be identified and routed for preferred handling versus the current first come first served and being abruptly placed on hold—creating a less than favorable ordering experience—and no records of kept of the abandoned sales lost as a result of this process.

Method of Order Delivery:

There are three keys:
Announcement telephone call 78 of next to be delivered
A unique horn honk 80 or other audible announcing the arrival
Confirmation 82 of the correct order being delivered To enhance a relationship, a customer is provided a pre-delivery announcement telephone call. After each delivery the driver will notify the center of a correct delivery. That notification will in turn trigger an announcement call (could be enhanced by a 2 way paging system or cellular internet connection where the driver logs each delivery as completed back to the center—also enhances safety by regularly identifying the driver's location) the center would make a computer generated call to announce to the next customer.

The call would announce to the customer that their pizza is next for delivery, the amount of the charge, the method of payment, and should arrive in the next few minutes, please listen for delivery signal "honk honk." The incorporation of a unique honk code that matches the company advertising ("haircut and a shave—two bits" level of brand recognition also similar to a party line unique ring) is a relationship issue by establishing the next step and expectation.

Further the call should confirm the correctness of the order by restating the order (via the recording) and allow for an IVR to make any corrections or adjustments. For example: "This is Pizza Company calling to let you know that your 2 large thin crust pepperoni pizzas are next for delivery, the total charge being applied to your visa card is $14.95.If this is correct please press any key. Thank you, for ordering—Now, please listen for the delivery signal 'honk honk' within the next few minutes"

Note: the horn honk or other unique audible has a secondary benefit besides relationship uniqueness—it is also, a time tested and proven method to increase dietary demand and reward recognition (e.g. Pavlov's dog experiments, and the age old dinner bell).

What About a Second Call in a Short Time from the Last Order:

Second call from same ANT within predetermined time frames (e.g. 10 minutes of post scheduled delivery indicates an order problem and goes to live Customer service representative operator). The Customer service representative for disputes or order following should have their screen popped by ANT with the most recent order the deliver route map of that order a conference call link of the producing store and the next closest store. Also, the client's name pronunciation should be whispered to the Customer service representative prior to the call being connected. The Customer service representative screen is enabled to place a priority order (next in oven) if required to correct an order.

SUMMARY

Each of the above requires a dynamic client history data base, a networked solution (internet or private network), and a call center integrated into each of them. The data base and the mining of the client history are at the center of the systemic relationship engine.

From the foregoing it will be seen that this invention is well adapted to attain all of the ends and objectives hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

What is claimed is:

1. A relationship building method for automated services, comprising in combination the steps of:
   receiving a contact from a client;
   looking for the client in a client data base;
   if the client is calling by telephone and does not like auto attendant, then transferring the client to a customer service representative;
   if the client is in the client data base, then:
      welcoming the client;
      presenting the client with an option of one or more services or goods that are usual for the client as determined by the client data base;
      if the client selects one of the usual services or goods, then processing the client request;
      if the client does not select one of the usual services or goods, then:
         presenting the client with a list of services or goods from which to select;
         entering the new request into the client data base; and
         processing the client request;
   if the client is not in the client data base, then:
      welcoming the client;
      ask the client for billing and delivery information;
      entering the client billing and delivery information into the client data base;
      presenting the client with a list of services or goods from which to select;
      entering the new request into the client data base; and
      processing the client request.

2. A relationship building method for automated services according to claim 1, wherein processing the client request further comprises the steps of:
   if the client is in the client data base, then:
      presenting the client with an option of one or more methods for delivery of services or goods that are usual for the client as determined by the client data base;
      if the client selects one of the usual methods of delivery, then further processing the client request;

if the client does not select one of the usual methods of delivery, then presenting the client with a list of delivery methods from which to select, entering the new method into the client data base and further processing the client request;

if the client is not in the client data base, then:
presenting the client with a list of delivery methods from which to select, entering the new method into the client data base and further processing the client request.

3. A relationship building method for automated services according to claim 2, wherein the services are rendered or the goods are distributed from a plurality of locations, and wherein further processing the client request comprises creating a plurality of web pages on a computer network, corresponding to the plurality of locations, and posting the client information and the client request information on a web page of the plurality of web pages corresponding to a location which is relatively close to the client.

4. A relationship building method for automated services according to claim 3, wherein presenting the client with a list of services or goods from which to select further comprises the step of presenting a series of options regarding services or goods.

5. A relationship building method for automated services according to claim 3, wherein:
receiving a contact from a client comprises receiving a telephone call from the client;
the relationship building method further includes using telephone caller identification; and
looking for the client in a client data base comprises determining what client or clients normally call from the identified telephone number.

6. A relationship building method for automated services according to claim 5, wherein:
receiving a contact from a client comprises receiving a telephone call from the client; and
the relationship building method further comprises communicating with the client is by means of interactive voice response.

7. A relationship building method for automated services according to claim 1, wherein the services are rendered or the goods are distributed from a plurality of locations, and wherein processing the client request comprises creating a plurality of web pages on a computer network, corresponding to the plurality of locations, and posting the client information and the client request information on a web page of the plurality of web pages corresponding to a location which is relatively close to the client.

8. A relationship building method for automated services according to claim 1, wherein presenting the client with a list of services or goods from which to select further comprises the step of presenting a series of options regarding services or goods.

9. A relationship building method for automated services according to claim 1, wherein:
receiving a contact from a client comprises receiving a telephone call from the client;
the relationship building method further includes using telephone caller identification; and
looking for the client in a client data base comprises determining what client or clients normally call from the identified telephone number.

10. A relationship building method for automated services according to claim 1, wherein:
receiving a contact from a client comprises receiving a telephone call from the client; and
the relationship building method further comprises communicating with the client is by means of interactive voice response.

11. A relationship building method for automated services, comprising in combination the steps of:
receiving a contact from a client;
looking for the client in a client data base;
if the client is calling by telephone and does not like auto attendant, then transferring the client to a customer service representative;
if the client is in the client data base and dials a predetermined speed dial number corresponding to predetermined services or goods, then processing the order that corresponds to the speed dial number;
if the client is in the data base and does not dial a preselected speed dial number, then:
welcoming the client;
presenting the client with an option of one or more services or goods that are usual for the client as determined by the client data base;
if the client selects one of the usual services or goods, then processing the client request; and
if the client does not select one of the usual services or goods, then presenting the client with a list of services or goods from which to select, entering the new request into the client data base and processing the client request.

12. A relationship building method for automated services in the delivery of goods and services from a plurality of locations, comprising in combination the steps of:
receiving a contact from a client by telephone or over a computer network;
looking for the client in a client data base;
if the client is calling by telephone and does not like auto attendant, then transferring the client to a customer service representative at a location relatively close to the client from the plurality of locations;
if the client is in the client data base, then:
welcoming the client;
presenting the client with an option of one or more services or goods that are usual for the client as determined by the client data base;
if the client selects one of the usual services or goods, then processing the client request;
if the client does not select one of the usual services or goods, then:
presenting the client with a list of services or goods from which to select;
entering the new request into the client data base; and
processing the client request;
if the client is not in the client data base, then:
welcoming the client;
ask the client for billing and delivery information;
entering the client billing and delivery information into the client data base;
presenting the client with a list of services or goods from which to select;
entering the new request into the client data base; and
processing the client request.

13. A relationship building method for automated services according to claim 12, wherein processing the client request further comprises the steps of:
   if the client is in the client data base, then:
      presenting the client with an option of one or more methods for delivery of services or goods that are usual for the client as determined by the client data base;
      if the client selects one of the usual methods of delivery, then further processing the client request;
      if the client does not select one of the usual methods of delivery, then presenting the client with a list of delivery methods from which to select, entering the new method into the client data base and further processing the client request;
   if the client is not in the client data base, then:
      presenting the client with a list of delivery methods from which to select, entering the new method into the client data base and further processing the client request.

14. A relationship building method for automated services according to claim 13, and wherein further processing the client request comprises creating a plurality of web pages on a computer network, corresponding to the plurality of locations, and posting the client information and the client request information on a web page of the plurality of web pages corresponding to a location which is relatively close to the client.

15. A relationship building method for automated services according to claim 14, wherein presenting the client with a list of services or goods from which to select further comprises the step of presenting a series of options regarding services or goods.

16. A relationship building method for automated services according to claim 14, wherein:
   receiving a contact from a client comprises receiving a telephone call from the client;
   the relationship building method further includes using telephone caller identification; and
   looking for the client in a client data base comprises determining what client or clients normally call from the identified telephone number.

17. A relationship building method for automated services according to claim 16, wherein:
   receiving a contact from a client comprises receiving a telephone call from the client; and
   the relationship building method further comprises communicating with the client is by means of interactive voice response.

18. A relationship building method for automated services according to claim 12, wherein processing the client request comprises creating a plurality of web pages on a computer network, corresponding to the plurality of locations, and posting the client information and the client request information on a web page of the plurality of web pages corresponding to a location which is relatively close to the client.

19. A relationship building method for automated services according to claim 12, wherein presenting the client with a list of services or goods from which to select further comprises the step of presenting a series of options regarding services or goods.

20. A relationship building method for automated services according to claim 12, wherein:
   receiving a contact from a client comprises receiving a telephone call from the client;
   the relationship building method further includes using telephone caller identification; and
   looking for the client in a client data base comprises determining what client or clients normally call from the identified telephone number.

21. A relationship building method for automated services according to claim 12, wherein:
   receiving a contact from a client comprises receiving a telephone call from the client; and
   the relationship building method further comprises communicating with the client is by means of interactive voice response.

22. A relationship building method for automated services according to claim 12 wherein delivery of the services is by a motor vehicle, further comprising:
   Announcing by telephone call of next to be delivered;
   Making unique audible sound from the motor vehicle, announcing the arrival of the order; and
   Confirming by telephone of the correct order being delivered.

* * * * *